United States Patent
Jiang et al.

(10) Patent No.: US 11,287,340 B2
(45) Date of Patent: Mar. 29, 2022

(54) MULTI-AXIS FORCE AND TORQUE SENSOR AND ROBOT HAVING THE SAME

(71) Applicant: Flexiv Ltd., Santa Clara, CA (US)

(72) Inventors: Hao Jiang, Mountain View, CA (US); Shiquan Wang, Foster City, CA (US)

(73) Assignee: FLEXIV LTD., Grand Cayman (KY)

( * ) Notice: Subject to any disclaimer, the term of this patent is extended or adjusted under 35 U.S.C. 154(b) by 157 days.

(21) Appl. No.: 16/456,588

(22) Filed: Jun. 28, 2019

(65) Prior Publication Data
US 2020/0003645 A1    Jan. 2, 2020

Related U.S. Application Data

(60) Provisional application No. 62/693,030, filed on Jul. 2, 2018.

(51) Int. Cl.
*G01L 5/16* (2020.01)
*G01L 1/12* (2006.01)
*G01L 3/10* (2006.01)

(52) U.S. Cl.
CPC ............ *G01L 5/16* (2013.01); *G01L 1/12* (2013.01); *G01L 3/101* (2013.01)

(58) Field of Classification Search
CPC ..... G01L 3/04; G01L 5/16; G01L 1/12; G01L 3/101; G01L 1/22; G11B 33/121; A61B 34/30
USPC ................................................... 73/862.043
See application file for complete search history.

(56) References Cited

U.S. PATENT DOCUMENTS

| | | | |
|---|---|---|---|
| 6,694,828 B1 | 2/2004 | Nicot | |
| 7,987,734 B2 | 8/2011 | Maehara | |
| 9,027,417 B2 | 5/2015 | Sato | |
| 9,989,427 B2 | 6/2018 | Teshigawara et al. | |
| 10,239,213 B1 * | 3/2019 | Reich | B25J 9/1638 |
| 2002/0056326 A1 | 5/2002 | Gombert et al. | |

(Continued)

FOREIGN PATENT DOCUMENTS

JP    5187940    7/1993

OTHER PUBLICATIONS

International Search Report and Written Opinion for App. No. PCT/US2019/040063 dated Jan. 5, 2021 (6 pages).

(Continued)

*Primary Examiner* — Octavia Hollington
(74) *Attorney, Agent, or Firm* — K&L Gates LLP

(57) ABSTRACT

A multi-axis force and torque sensor and a robot are provided. The sensor includes a first supporting element, a second supporting element, a deformable component connected between the first supporting element and the second supporting element, and multiple signal pairs. The deformable component is configured to deflect in response to applied external force and torque in multiple directions. Each of the multiple signal pairs includes a magnet and a hall effect detector. The magnet is mounted on one of the first supporting element and the second supporting element, and the hall effect detector is mounted on the other. The hall effect detector is located corresponding to the respective magnet. One or more magnetization directions of the magnets of the signal pairs are different such that the signal pairs are capable of measuring force and torque applied on the first supporting element and the second supporting element in different directions.

18 Claims, 7 Drawing Sheets

(56) References Cited

U.S. PATENT DOCUMENTS

| | | |
|---|---|---|
| 2007/0000335 A1 | 1/2007 | Morimoto |
| 2009/0013803 A1 | 1/2009 | Lohr et al. |
| 2009/0241691 A1 | 10/2009 | Bernstein et al. |
| 2018/0099421 A1 | 4/2018 | Ogata |
| 2019/0064015 A1* | 2/2019 | Wang .................. G01L 3/08 |

OTHER PUBLICATIONS

International Search Report for App. No. PCT/US19/40063 dated Jul. 1, 2019 (8 pages).

* cited by examiner

MULTI-AXIS FORCE AND TORQUE SENSOR AND ROBOT HAVING THE SAME

CROSS-REFERENCE TO RELATED APPLICATIONS

The present application claims the benefit of priority under 35 U.S.C. § 119(e) to U.S. Provisional Patent Application Ser. No. 62/693,030, entitled "ROBUST SIX DEGREE OF FREEDOM FORCE AND TORQUE SENSOR WITH OVERLOAD PROTECTION" and filed on Jul. 2, 2018, the disclosure of which is herein incorporated by reference in its entirety.

TECHNICAL FIELD

The present disclosure generally relates to sensing technology, and in particular to a multi-axis force and torque sensor and a robot having the same.

BACKGROUND

Multi-axis force and torque sensors are widely used in robotic manipulation, automation industries, and laboratory experiments. Existing solutions use strain-gauge-based or encoder-based designs. Strain-gauge sensors are susceptible to temperature changes and variable manufacturing quality, and also have high manufacturing costs. Encoder-based sensors are more robust, but have low stiffness, which can significantly affect the overall dynamics of the system and result in a low mechanical bandwidth that is not suitable for high-speed sensing and control applications. Large structural deflection also contributes to severe crosstalk issues and nonlinearity.

In view of the above, there is a need for a new type of multi-axis force and torque sensor.

SUMMARY

Accordingly, the present disclosure aims to provide a multi-axis force and torque sensor and a robot having the same.

To solve the above-mentioned problem, a technical scheme adopted by the present disclosure is to provide a multi-axis force and torque sensor. The sensor may include a first supporting element, a second supporting element, a deformable component connected between the first supporting element and the second supporting element, and a number of signal pairs. The deformable component is configured to deflect in response to applied external force and torque in multiple directions. Each of the number of signal pairs includes a magnet and a hall effect detector. The magnet is mounted on one of the first supporting element and the second supporting element. The hall effect detector is mounted on the other of the first supporting element and the second supporting element, and is located corresponding to the respective magnet. The magnetization directions of the magnets of the number of signal pairs are different such that the number of signal pairs are capable of measuring force and torque applied on the first supporting element and the second supporting element in different directions.

To solve the above-mentioned problem, another technical scheme adopted by the present disclosure is to provide a multi-axis force and torque sensor. The sensor may include an upper sensing assembly and a lower sensing assembly stacked together. The upper sensing assembly includes a first disk, a second disk, a first flexure element connected between the first disk and the second disk, and multiple first signal pairs. The flexure element is configured to deflect in response to applied external force and torque in multiple directions. Each of the multiple signal pairs includes a first signal emitter and a first signal receiver. The first signal emitter is mounted on one of the first disk and the second disk. The first signal receiver is mounted on the other of the first disk and the second disk and is located corresponding to the first signal emitter.

The lower sensing assembly includes a third disk, a fourth disk, a second flexure element connected between the third disk and the fourth disk, and multiple second signal pairs. The flexure element is configured to deflect in response to applied external force and torque in multiple directions. Each of the second signal pairs includes a second signal emitter and a second signal receiver. The second signal emitter is mounted on one of the third disk and the fourth disk. The second signal receiver is mounted on the other of the third disk and the fourth disk and located corresponding to the second signal emitter. The arrangements of the first and second signal pairs are different such that the first signal pairs and the second signal pairs are configured to measure the applied external force and torque in multiple directions.

To solve the above-mentioned problem, another technical scheme adopted by the present disclosure is to provide a robot. The robot may include multiple links and an end effector successively connected. The end effector includes a multi-axis force and torque sensor configured to measure force and torque applied on the end effector. The multi-axis force and torque sensor includes a first supporting element, a second supporting element, a deformable component connected between the first supporting element and the second supporting element, and a plurality of signal pairs. The deformable component is configured to deflect in response to applied external force and torque in multiple directions. Each of the plurality of signal pairs includes a magnet and a hall effect detector. The magnet is mounted on one of the first supporting element and the second supporting element. The hall effect detector is mounted on the other of the first supporting element and the second supporting element, and is located corresponding to the respective magnet. The magnetization directions of the magnets of the plurality of signal pairs are different such that the plurality of signal pairs are capable of measuring force and torque applied on the first supporting element and the second supporting element in different directions.

According to the present disclosure, the multi-axis force and torque sensor may include multiple signal pairs. These signal pairs may be used for calculation of force and torque applied on the sensor in different directions and may also be used for off-axis load cancelation and temperature compensation. Thus, the sensor provided by the present disclosure may be utilized to measure force and torque acting thereon in different directions more precisely.

BRIEF DESCRIPTION OF THE DRAWINGS

In order to clearly explain the technical solutions in the embodiments of the present disclosure, the drawings used in the description of the embodiments will be briefly described below. The drawings in the following description are merely exemplary embodiments of the present disclosure. For those of ordinary skill in the art, other embodiments may also be derived based on these drawings without any creative work.

DETAILED DESCRIPTION

The disclosure will now be described in detail with reference to the accompanying drawings and examples. The described embodiments are merely exemplary and represent a subset of the embodiments of the present disclosure. One skilled in the art may recognize additional embodiments based on the embodiments of the present disclosure without creative efforts and all such embodiments fall within the scope of the present disclosure.

Figure 1:
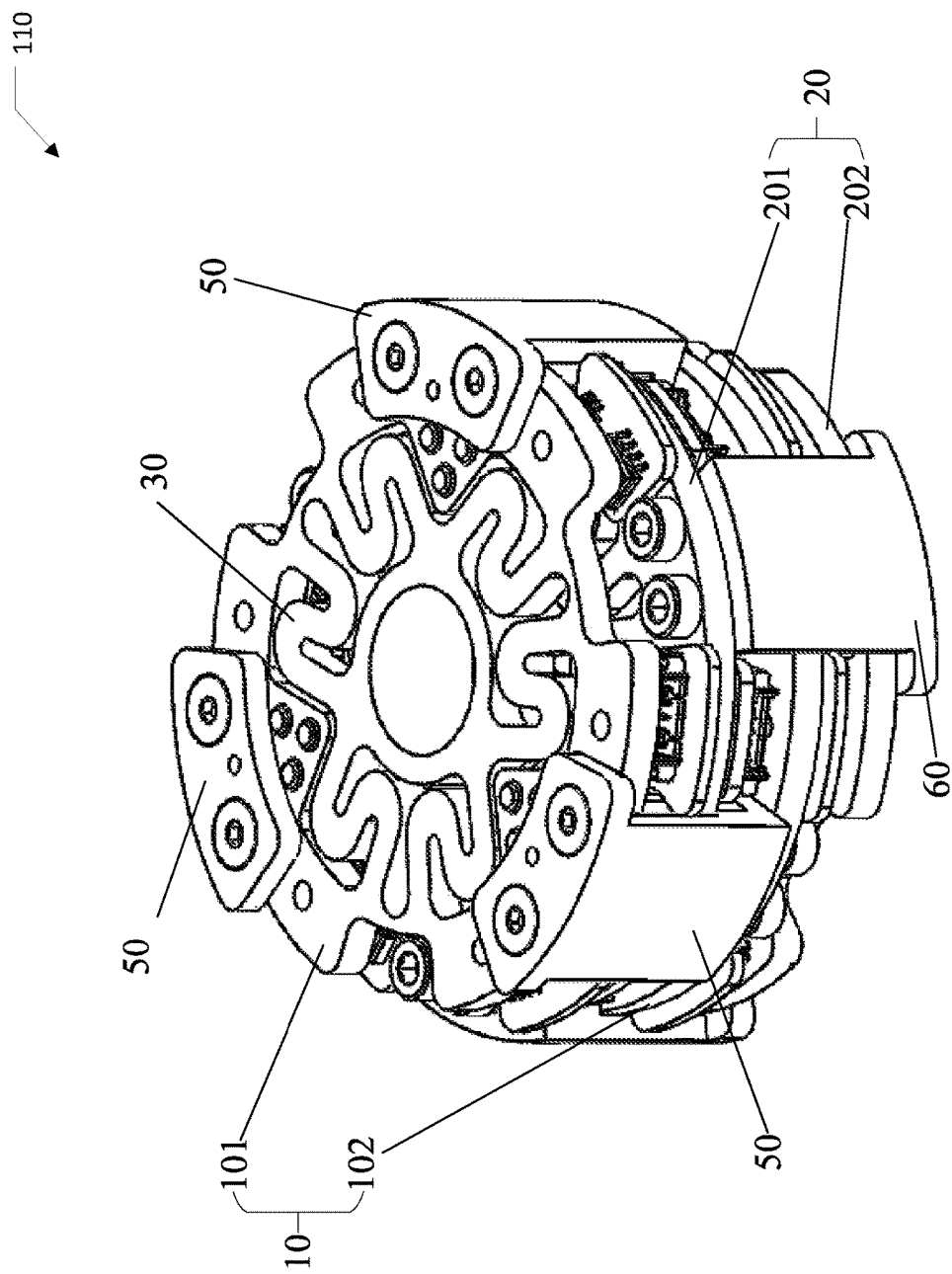
FIG. 1 illustrates an isometric view of a multi-axis force and torque sensor according to an embodiment of the present disclosure.
Figure 2:
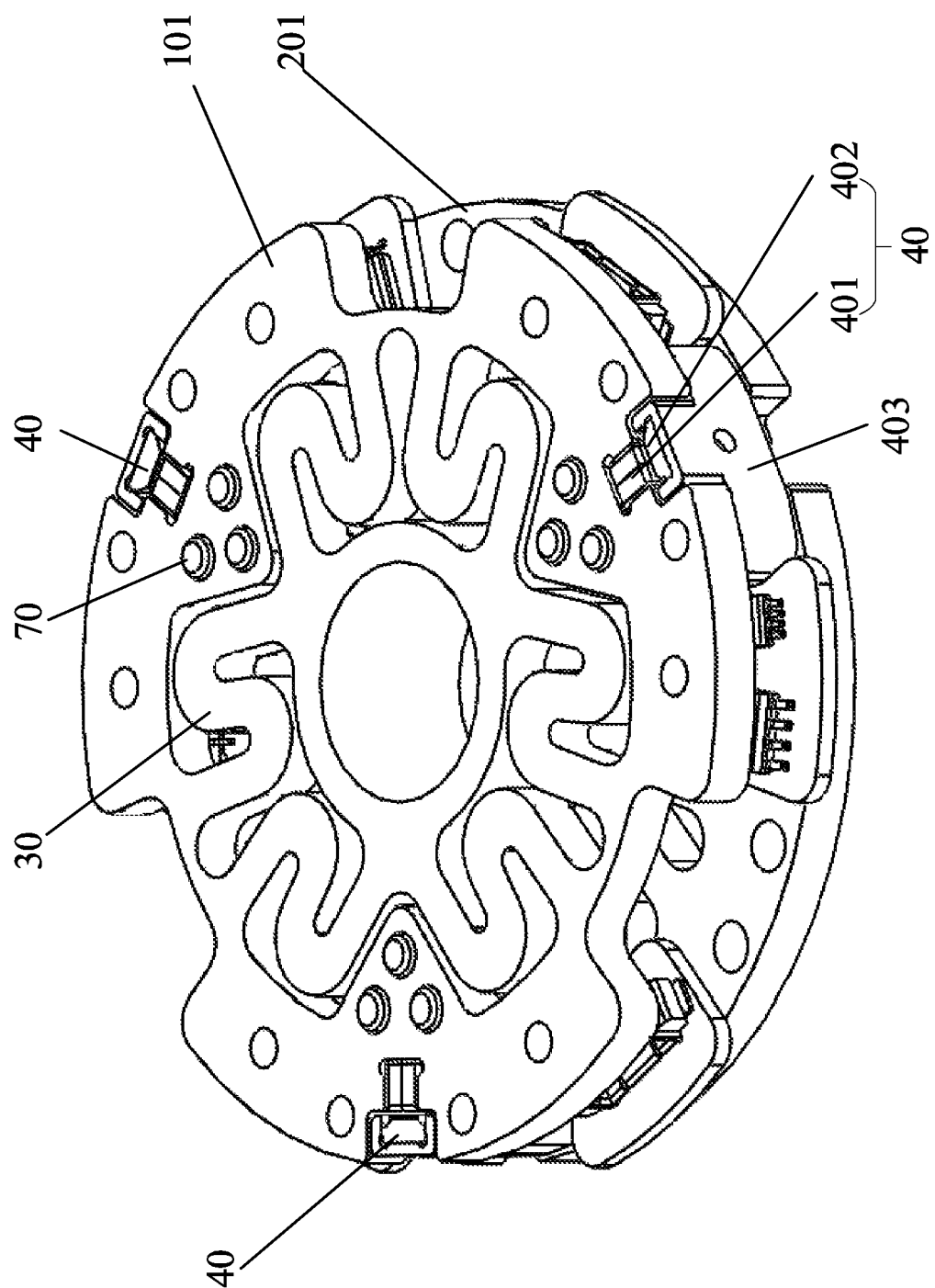
FIG. 2 is a schematic diagram of an example sensing assembly of a multi-axis force and torque sensor according to an embodiment of the present disclosure.
Figure 3:
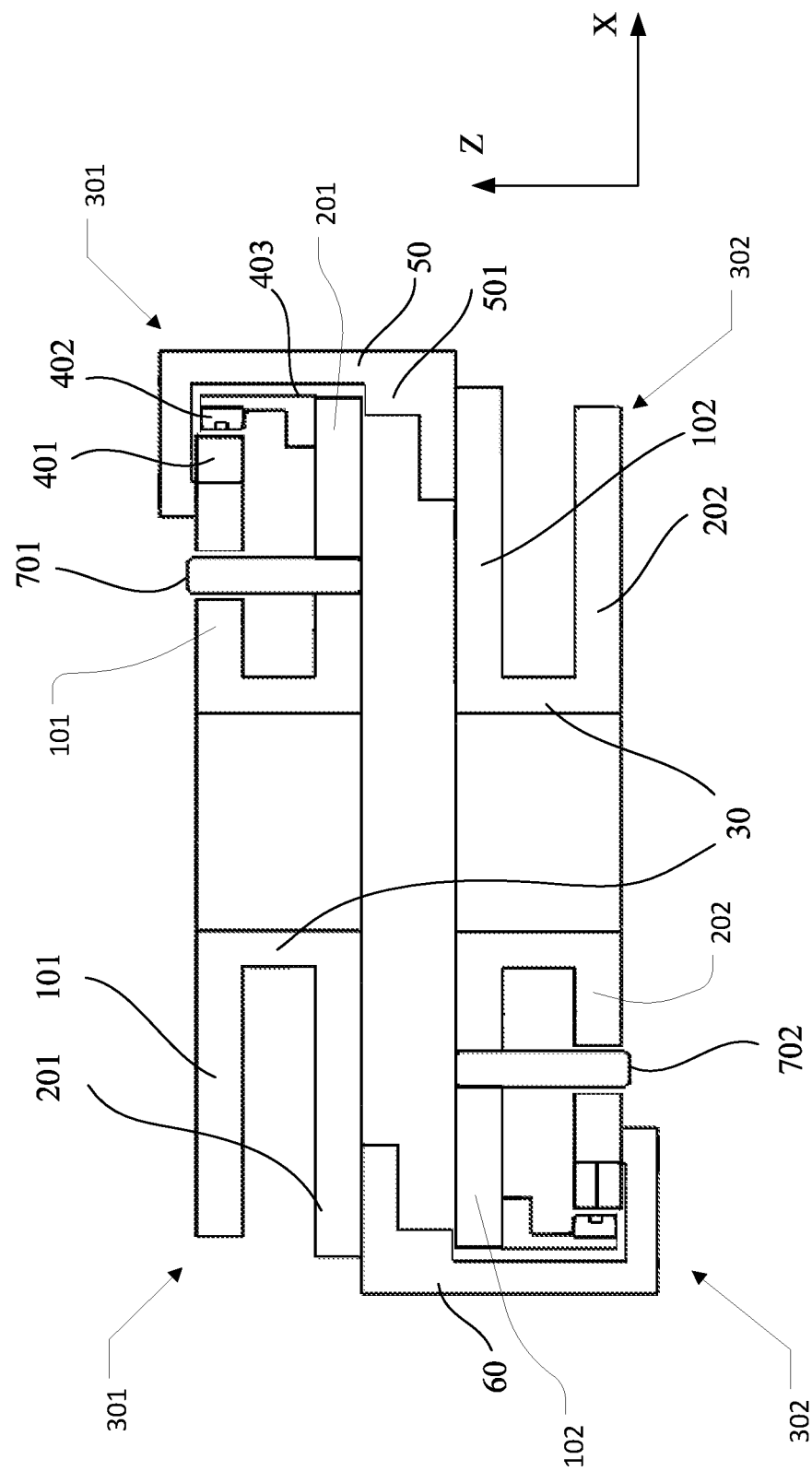
FIG. 3 illustrates a cross-section view of a multi-axis force and torque sensor according to an embodiment of the present disclosure.

FIGS. 1 to 3 show the structure of an example multi-axis force and torque sensor 110 according to an embodiment of the present disclosure. As shown in FIGS. 1-3, the multi-axis force and torque sensor 110 may include a first supporting element 10, a second supporting element 20, a deformable component 30, and a number of signal pairs 40.

In some aspects of the present disclosure, a deformable component 30 may be connected between the first supporting element 10 and the second supporting element 20. The deformable component 30 may be designed in such a way that force or torque applied in a first direction on the supporting element 10 and in a second, different direction on the supporting element 20 will cause the deformable component 30 to deflect such that there is relative motion between the two supporting elements 10 and 20. In some embodiments, the first supporting element 10, the second supporting element 20, and the deformable component 30 may be made of the same material, for example, aluminum alloy, titanium alloy, stainless steel alloy, etc.

In some examples, each signal pair 40 of the multi-axis force and torque sensor 110 may include a signal emitter 401 and a signal receiver 402. The signal emitter 401 may be installed on either the first supporting element 10 or the second supporting element 20 and the signal receiver 402 may be installed on the other supporting element. The example configuration enables the signal emitter 401 and the signal receiver 402 to be used to cooperatively detect the relative displacement between the first supporting element 10 and the second supporting element 20.

In some embodiments, the signal pairs 40 may be configured such that the relative displacement detected between the supporting elements 10 and 20 by the signal pairs 40 enables the calculation of force or torque acting on the multi-axis force and torque sensor 110 in different directions. For example, the multi-axis force and torque sensor 110 may include six signal pairs 40. The six signal pairs 40 may be configured to measure the relative displacement between the first supporting element 10 and the second supporting element 20 in different directions (axial, radial and circumferential directions). The detected results may then be used to calculate force and torque acting on the multi-axis force and torque sensor 110 in six axes, or directions (e.g., x-translation, y-translation, z-translation, x-rotation, y-rotation, and z-rotation).

In some embodiments of the present disclosure, the multi-axis force and torque sensor 110 may include more pairs (e.g., 3, 4, or more) of signal emitters 21 and signal receivers 22 in each signal pair 40. Such signal pairs 40 with additional pairs of signal emitters 21 and signal receivers 22 may enable a more precise calculation of force and torque applied on the multi-axis force and torque sensor 110 in different directions. They may also be used for off-axis load cancelation and temperature compensation, which also may enable a more precise calculation of force and torque applied on the multi-axis force and torque sensor 110 in different directions.

In some examples of the present disclosure, the signal pairs 40 may be inductive, capacitive, resistive, optical, or may use other suitable signaling modalities. In some embodiments, the signal emitter 401 of each signal pair 40 may be a magnet while the corresponding signal receiver 402 may be a hall effect sensor.

A hall effect sensor may work as follows. When a hall effect sensor detects the magnetic field strength perpendicular to a magnetization axis of a magnet and is capable of moving along the magnetization axis, the relationship between the displacement of the hall effect sensor and the magnetic field strength detected by the hall effect sensor is substantially linear. When a hall effect sensor detects the magnetic field strength perpendicular to the magnetization axis of a magnet and is capable of moving perpendicular to the magnetization axis, the relationship between the detected magnetic field strength and the displacement of the sensor is less linear and can be modeled with non-linear functions, e.g., polynomial functions. The magnetization directions of the magnets of the signal pairs 40 may accordingly be arranged differently such that the signal pairs 40 are capable of measuring force and torque applied on the first supporting element 10 and the second supporting element 20 in different directions.

In some embodiments, the first supporting element 10 may include a first disk 101 and a third disk 102 and the second supporting element 20 may include a second disk 201 and a fourth disk 202. The first disk 101, the second disk 201, the third disk 102, and the fourth disk 202 may extend substantially parallel to each other, as shown in FIG. 1. In such embodiments, the deformable component 30 may include a first flexure element (not labeled) and a second flexure element (not labeled). The first disk 101 and the second disk 201 may be connected by the first flexure element, and cooperatively constitute an upper sensing assembly 301. The third disk 102 and the fourth disk 202 may be connected by the second flexure element and cooperatively constitute a lower sensing assembly 302. In this embodiment, both the upper sensing assembly 301 and lower sensing assembly 302 may have an H-shaped configuration, as shown in FIG. 3.

In some examples, the upper sensing assembly 301 may be stacked on the lower sensing assembly 302. In such examples, the signal pairs 40 may be evenly distributed on the two respective sensing assemblies 301 and 302. The even distribution may enable an easier installation of the signal pairs 40 and may reduce interference between the signal pairs 40. In some embodiments, the first supporting element 10 and the second supporting element 20 may each include only one disk. For example, the first supporting element 10 may only include a first disk 101 and the second supporting element 20 may only include a third disk 102. In such embodiments, the signal pairs 40 may be mounted on the two disks (e.g., the first disk 101 and the third disk 102) for measuring relative motion between the two supporting elements 10 and 20.

As illustrated in FIGS. 1 to 3, in some embodiments, the multi-axis force and torque sensor 110 may further include a number of bridging structures 50 and 60 (e.g., six in the illustrated example). In various aspects, the first bridging structures 50 may be configured to rigidly connect the first disk 101 and the third disk 102 while the second bridging structures 60 may be configured to rigidly connect the second disk 201 and the fourth disk 202. In some examples, the bridging structures 50 and 60 may be much stiffer than the first supporting element 10 and the second supporting element 20. In such examples, when a pure force or a Z-axis torque (e.g., as shown in FIG. 3), or a combination of both, is applied on the multi-axis force and torque sensor 110, the much stiffer bridging structures 50 and 60 may enable the load to be evenly distributed through the upper and lower sensing assemblies 301 and 302. When an X-axis (e.g., as shown in FIG. 3) or Y-axis (e.g., into or out of the page in FIG. 3) torque is applied to the multi-axis force and torque sensor 110, the rigidity of the bridging structures 50 and 60 enables a large portion of the torque load to be distributed into X-axis and Y-axis forces on the upper and lower sensing assemblies 301 and 302. This distribution into X-axis and Y-axis forces may result in an optimized and enlarged stiffness in X-axis and Y-axis torsion in some instances. In various instances, the parallel bridging structures 50 and 60 may increase the stiffness of the overall multi-axis force and torque sensor 110 against moments applied around the X-axis and Y-axis, so as to achieve the desired sensing sensitivity over the six sensing DOFs (degrees of freedom) of the multi-axis force and torque sensor 110.

In some examples of the present disclosure, the bridging structures 50 and 60 may at least partially enclose the signal pairs 40 to shield the signal emitter 401 and signal receiver 402 from being disturbed by external signals. In some examples, the bridging structures 50 and 60 may be made of a material based on the type of signal pairs 40 used. For example, if magnetic signals are used in the signal pairs 40, the bridging structures 50 and 60 may be made from high magnetic permeability material such as supermalloy, super-mumetal alloys, sanbold, permalloy, carbon steel, martensite steel, etc. If optical signals are used in the signal pairs 40, the bridging structures 50 and 60 may be made from light blocking material such as opaque plastics, metals, rubber, etc.

Referring to FIG. 2, the multi-axis force and torque sensor 110 may further include multiple dowel pins 70. FIG. 3 shows a cross-section of an embodiment with dowel pins 701 and 702. In some examples, the dowel pin 701 may extend from the second disk 201 and pass through the first disk 101. There may exist clearance (e.g., a gap) between the dowel pin 701 and the first disk 101 in the extending direction of the first disk 101, as illustrated in FIG. 3. In some examples, the dowel pin 702 may extend from the third disk 102 and pass through the fourth disk 202. There may also exist clearance (e.g., a gap) between the dowel pin 702 and the fourth disk 202 in the extending direction of the fourth disk 202, as illustrated in FIG. 3.

Returning to FIG. 2, the dowel pins 70 may provide X-axis and Y-axis translational and Z-axis torsional overload protections such that the deformable component 30 may be prevented from over deflection in the radial direction and the circumferential direction of the multi-axis force and torque sensor 110. For instance, returning to FIG. 3, if an upper sensing assembly 301 or lower sensing assembly 302 excessively deflects under external force or torque, the dowel pin 701 and/or dowel pin 702 may move through their respective clearance (e.g., gap) and contact the corresponding disk. For example, an overload may cause the dowel pin 701 to contact the first disk 101 and the dowel pin 702 to contact the fourth disk 202. The dowel pins 701 and 702 may thereby prevent further deflection of the upper sensing assembly 301 and/or the lower sensing assembly 302, respectively, that may cause plastic deformation and damage the upper sensing assembly 301 or the lower sensing assembly 302.

In some embodiments of the present disclosure, the bridging structures 50 and/or the bridging structures 60 may have a stop block. The stop block may enable X-axis and Y-axis torsional and Z-axis translational overload protection. For example, as shown in FIG. 3, the bridging structures 50 may include a stop block 501. The stop block 501 may be slightly spaced apart from the second disk 201 in the axial direction (e.g., Z-axis as illustrated) of the multi-axis force and torque sensor 110. In the illustrated example, when the first disk 101 moves excessively closer or farther from the second disk 201 (e.g., along the direction of the illustrated Z-axis), the second disk 201 contacts the stop block 501, and the rigid compression between the second disk 201 and the stop block 501 may prevent further motion that may cause plastic deformation and damage the upper sensing assembly 301. In some examples, the bridging structure 60 may have a stop block that is configured identically to protect the example lower sensing assembly 302.

Referring to FIG. 3, in some embodiments, a holding structure 403 may be installed on the second disk 201 (and identically on the third disk 102) for mounting the signal receiver 402. In such embodiments, the stop block 501 may be configured to hit the holding structure 403 instead of the second disk 201 when excessive external force or torque is applied. It should be understood that the bridging structures 60 may have similar or identical structure and function as the bridging structures 50 as described herein even though the structure and function of the bridging structures 60 is not described in detail herein.

Figure 4:
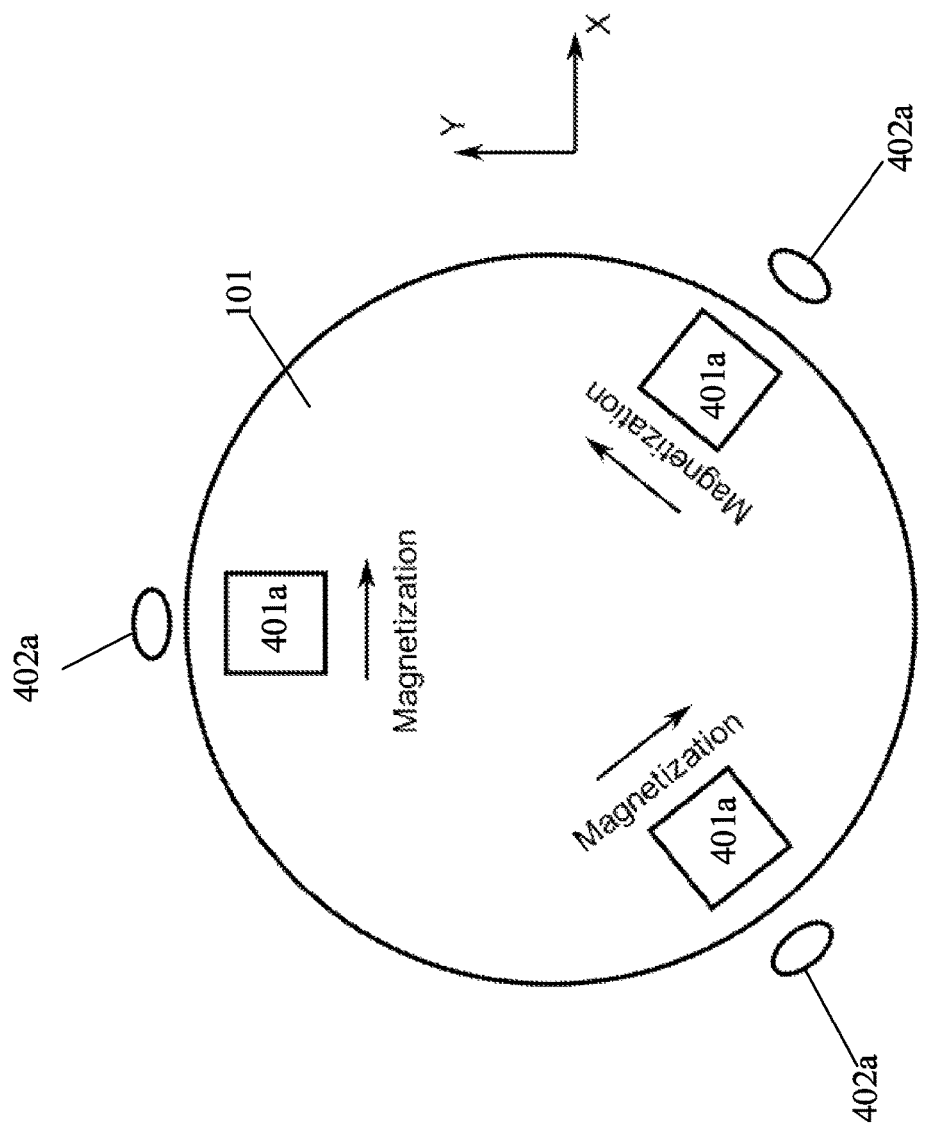
FIG. 4 shows an exemplary arrangement of signal pairs on the first disk of a multi-axis force and torque sensor according to an embodiment of the present disclosure.
Figure 5:
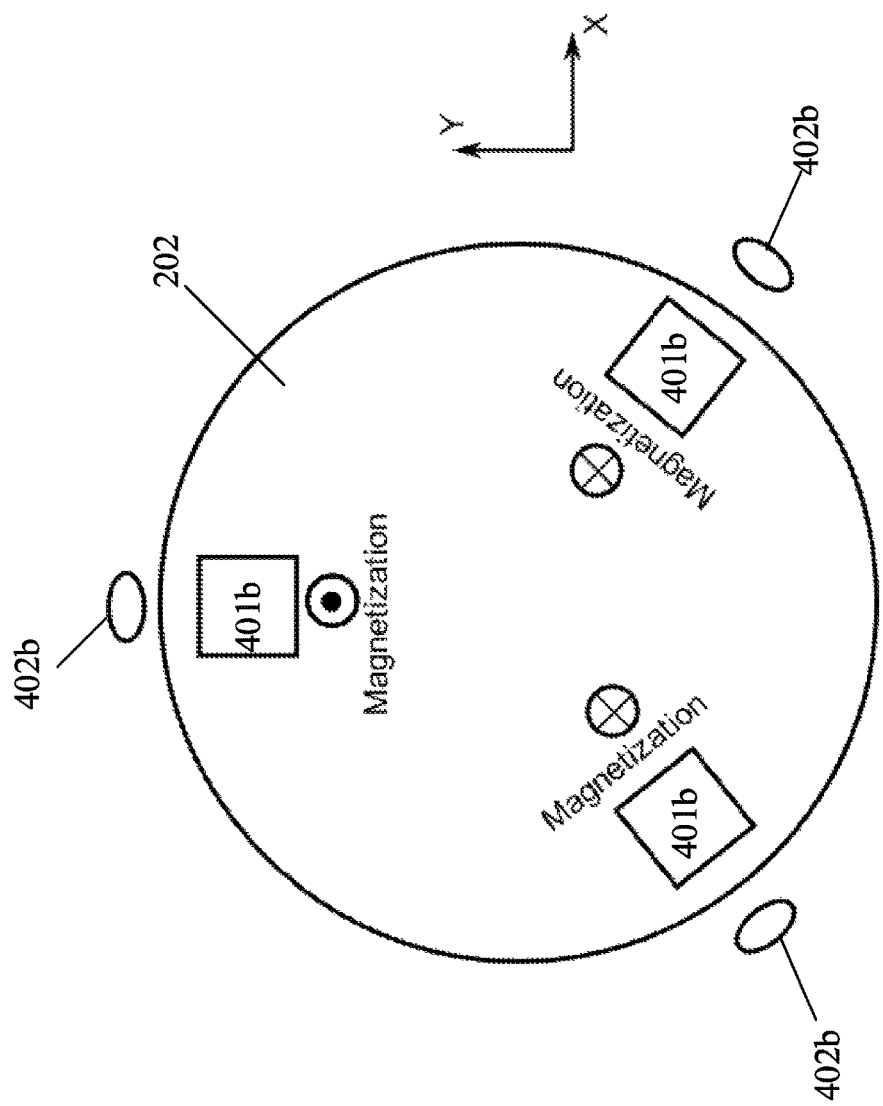
FIG. 5 shows an exemplary arrangement of signal pairs on the fourth disk of a multi-axis force and torque sensor according to an embodiment of the present disclosure.

FIGS. 4 and 5 illustrate an exemplary arrangement of the signal pairs 40 on the first supporting element 10 and the second supporting element 20, respectively. In this embodiment, the multi-axis force and torque sensor 110 may include six magnetic signal pairs 40, three on the first supporting element 10 and three on the second supporting element 20. In one example, the magnetization direction of the magnets 401a installed on the first disk 101 may be parallel to the circumferential direction of the multi-axis force and torque sensor 110, as shown in FIG. 4. The magnetization direction of the magnets 401b installed on the fourth disk 202 may be parallel to the axial direction of the multi-axis force and torque sensor 110, as shown in FIG. 5. The hall effect sensors 402a are illustrated opposite the magnets 401a in FIG. 4 and the hall effect sensors 402b are illustrated opposite the magnets 402a in FIG. 5.

In the depicted configuration of the upper sensing assembly 301 on which the magnets 401a and the hall effect sensors 402a are installed (as shown in FIG. 4) may detect all six forces/torques except the Z-axial force, but only torques around the Z axis can be directly computed from this single upper sensing assembly 301. In the depicted configuration of the lower sensing assembly 302 on which the magnets 401b and the hall effect sensors 402b are installed (as shown in FIG. 5) may detect all six forces/torques except torques around the Z-axis, but only the Z-axial forces can be directly computed from this single lower sensing assembly 302. By applying a simple transfer function of the mechanical structure of the multi-axis force and torque sensor 110, however, the deflection and forces/torques on the entire multi-axis force and torque sensor 110 can be derived.

For example, a six-dimensional force/torque applied on the whole multi-axis force and torque sensor 110 may cause each hall effect sensor 402a or 402b to linearly move in all three dimensions (e.g., along the X-axis, Y-axis, and Z-axis) with respect to its corresponding magnet 401a or 401b. Two out of the three types of motions (e.g., along movement along the X-axis and Y-axis) can be picked up by the change in magnetic fields, while the last type of motion (e.g., movement along to Z-axis) cannot be. The two types of motions that are picked up can be calculated with either a linear or non-linear function. Thus, with the reading changes in each hall effect sensor 402a or 402b, the motion of each hall effect sensor 402a or 402b with respect to its magnet 401a or 401b may be derived. Applying a simple transfer function of the mechanical structure, the deflection and forces/torques on the entire multi-axis force and torque sensor 110 can be derived. Therefore, all six forces and torques can be computed from the six signal pairs 40 by using a calibration method, according to one aspect of the present disclosure.

Additionally, in some instances, because not all the magnets 401a or 401b are polarized in the same direction for each upper and lower sensing assembly 301 and 302, the temperature influence on the sensing assemblies 301 and 302 may be suppressed by using a differential method. For example, signal changes caused by temperature shifts make signals from the signal pairs 40 change with the same trend, and thus by subtracting one from the other, the temperature shifts can be suppressed. In other aspects of the present disclosure, the arrangement of the signal pairs 40 may be different than shown in FIGS. 4 and 5 to achieve the same described purpose.

Figure 6:
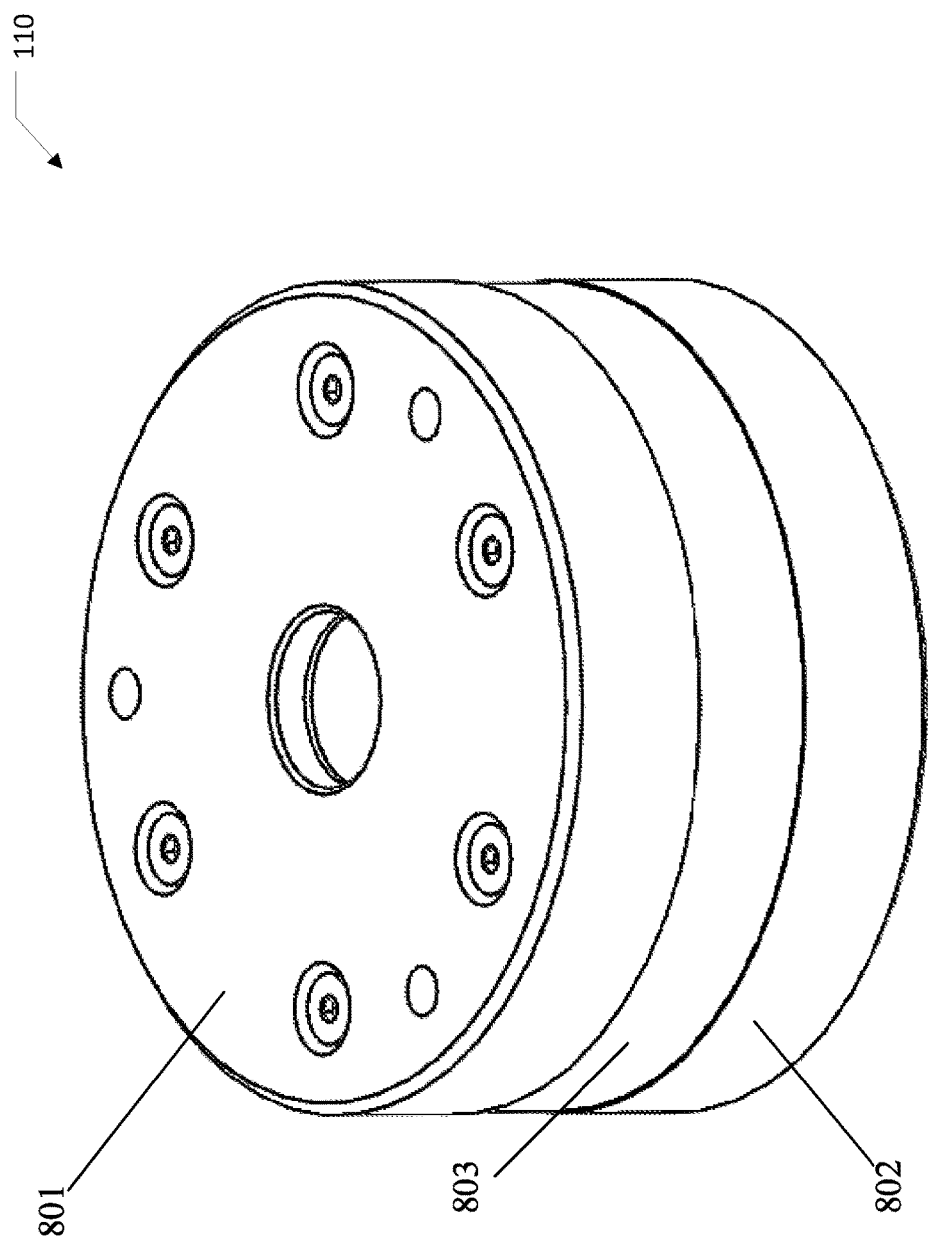
FIG. 6 is a schematic diagram of a multi-axis force and torque sensor according to an embodiment of the present disclosure.

Referring to FIG. 6, the multi-axis force and torque sensor 110 may further include a top case 801, a bottom case 802, and a seal 803. The top case 801 may be fixedly connected to the first supporting element 10, and the bottom case 802 may be fixedly connected to the second supporting element 20. The seal 803 may be connected between the top case 801 and the bottom case 802. The top case 801, the bottom case 802, and the seal 803 may cooperatively enclose the first supporting element 10, the second supporting element 20, the deformable component 30, and the signal pairs 40, and may prevent external water or dust from entering inside and damaging these components.

Figure 7:
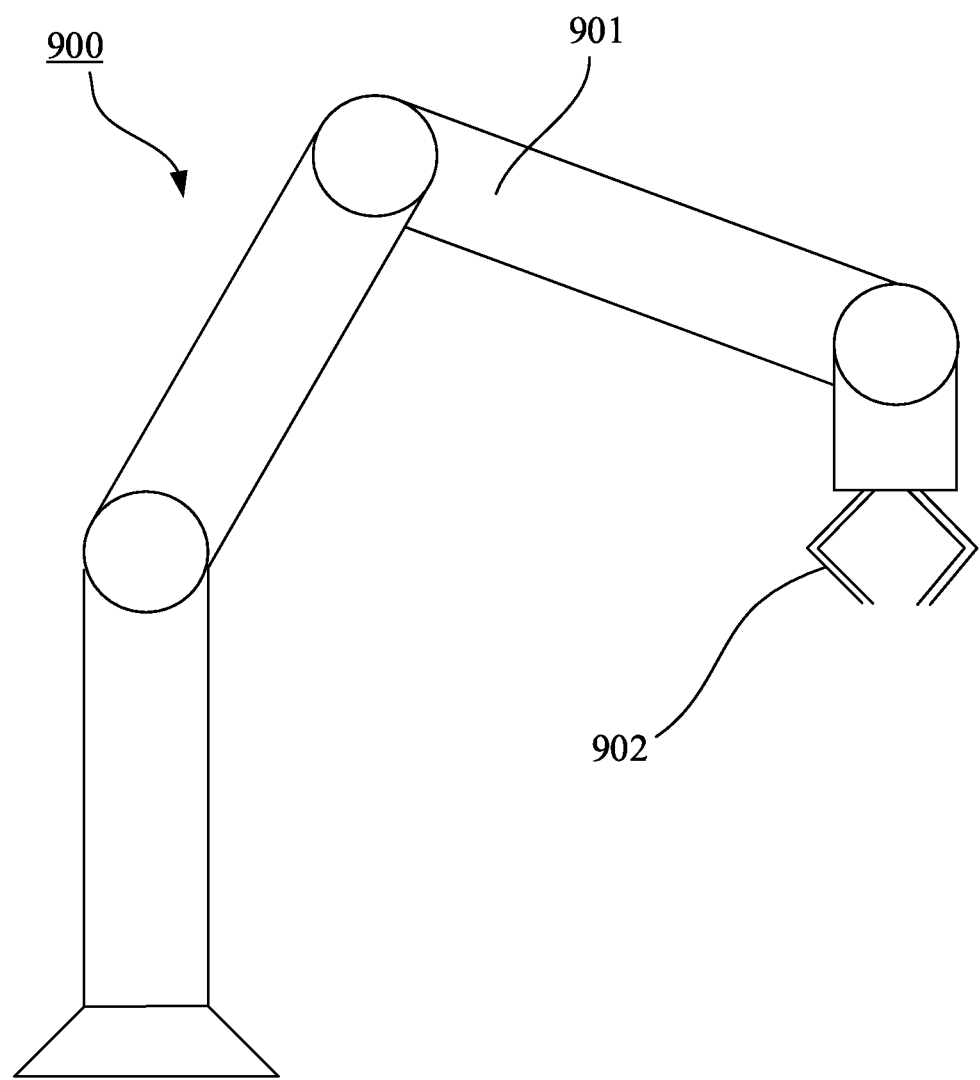
FIG. 7 is a schematic diagram of a robot according to an embodiment of the present disclosure.

The present disclosure also provides for a robot and an end effector. FIG. 7 illustrates an example robot 900 that may include multiple links 901 and an end effector 902 successively connected. The end effector 902 may include a multi-axis force and torque sensor 110 which is utilized to measure external force and torque acting on the end effector 902. The multi-axis force and torque sensor 110 may be similar to any one of the embodiments described above. In other embodiments, the multi-axis force and torque sensor 110 may alternatively be utilized other parts (e.g., the actuator) of the robot 900.

In other examples according to the present disclosure, the multi-axis force and torque sensor 110 may be utilized in other fields and devices, for example, industrial robots, humanoid robots, vehicles, driving devices, measuring devices etc.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

What is claimed is:

1. A multi-axis force and torque sensor, comprising:
a first supporting element including a first disk and a third disk;
a second supporting element including a second disk and a fourth disk, wherein the first disk, the second disk, the third disk, and the fourth disk are substantially parallel to each other;
a deformable component including (i) a first flexure element connecting the first disk to the second disk and (ii) a second flexure element connecting the third disk to the fourth disk, the deformable component configured to deflect in response to applied external force and torque in multiple directions; and
a plurality of signal pairs, each including a magnet and a hall effect detector,
wherein the magnet is mounted on one of the first supporting element and the second supporting element,
wherein the hall effect detector is mounted on the other of the first supporting element and the second supporting element, and is located corresponding to the respective magnet,
wherein the magnetization directions of the magnets of the plurality of signal pairs are different such that the plurality of signal pairs are capable of measuring force and torque applied on the first supporting element and the second supporting element in different directions, and
wherein the first disk and the second disk cooperatively constitute an upper sensing assembly and the third disk and fourth disk cooperatively constitute a lower sensing assembly, and the upper sensing assembly is stacked on the lower sensing assembly.

2. The sensor of claim 1, wherein
the plurality of signal pairs include six signal pairs,
the magnetization directions of the magnets of three of the six signal pairs are parallel to a circumferential direction of the sensor, and
the magnetization directions of the magnets of the other three of the six signal pairs are parallel to an axial direction of the sensor.

3. The sensor of claim 1, further comprising:
a plurality of first bridging structures rigidly connecting the first disk and the third disk, and
a plurality of second bridging structures rigidly connecting the second disk and the fourth disk.

4. The sensor of claim 3, wherein each of the plurality of first and second bridging structures includes high magnetic permeability material, and is located corresponding to and at least partially enclosing a respective one of the plurality of signal pairs.

5. The sensor of claim 3, wherein each of the plurality of first bridging structures includes a first stop block spaced apart from the second disk in an axial direction of the sensor, the first stop block configured to prevent the first flexure element from over deflection in the axial direction, and each of the plurality of second bridging structures includes a second stop block spaced apart from the third disk in the axial direction of the sensor, the second stop block configured to prevent the second flexure element from over deflection in the axial direction.

6. The sensor of claim 5, further comprising:

a first dowel pin extending from the second disk and passing through the first disk, wherein there is clearance between the first dowel pin and the first disk in an extending direction of the first disk, and wherein the first dowel pin is configured to prevent the first flexure element from over deflection in a radial direction and a circumferential direction of the sensor; and a second dowel pin extending from the third disk and passing through the fourth disk, wherein there is clearance between the second dowel pin and the fourth disk in an extending direction of the fourth disk, and wherein the second dowel pin is configured to prevent the second flexure element from over deflection in a radial direction and a circumferential direction of the sensor.

7. The sensor of claim 1, further comprising:

a top case connected to the first supporting element;

a bottom case connected to the second supporting element; and a seal connected between the top case and the bottom case, wherein the top case, the bottom case, and the seal cooperatively enclose the first supporting element, the second supporting element, the deformable component, and the plurality of signal pairs.

8. A multi-axis force and torque sensor, comprising an upper sensing assembly and a lower sensing assembly stacked together, wherein the upper sensing assembly comprises:
a first disk;
a second disk;
a first flexure element connected between the first disk and the second disk, the first flexure element configured to deflect in response to applied external force and torque in multiple directions; and
a plurality of first signal pairs, each including a first signal emitter and a first signal receiver, wherein the first signal emitter is mounted on one of the first disk and the second disk, and the first signal receiver is mounted on the other of the first disk and the second disk and located corresponding to the first signal emitter; and the lower sensing assembly comprises:
a third disk;
a fourth disk;
a second flexure element connected between the third disk and the fourth disk, of the second flexure element configured to deflect in response to applied external force and torque in multiple directions; and
a plurality of second signal pairs, each including a second signal emitter and a second signal receiver, wherein the second signal emitter is mounted on one of the third disk and the fourth disk, and the second signal receiver is mounted on the other of the third disk and the fourth disk and located corresponding to the second signal emitter, wherein the first and second signal pairs are arranged differently such that the first signal pairs and the second signal pairs are configured to measure the applied external force and torque in multiple directions.

9. The sensor of claim 8, wherein the first signal emitter and the second signal emitter are magnets, and the first signal receiver and the second signal receiver are hall effect detectors.

10. The sensor of claim 9, wherein a magnetization direction of the first signal emitter of each of the plurality of first signal pairs is parallel to a circumferential direction of the sensor;

a magnetization direction of the second signal emitter of each of the plurality of second signal pairs is parallel to an axial direction of the sensor.

11. The sensor of claim 8, further comprising:

a plurality of first bridging structures rigidly connecting the first disk and the third disk; and a plurality of second bridging structures rigidly connecting the second disk and the fourth disk.

12. The sensor of claim 11, wherein each of the first bridging structures includes a first stop block spaced apart from the second disk in an axial direction of the sensor, the first stop block configured to prevent the first flexure element from over deflection in the axial direction, and each of the second bridging structures includes a second stop block spaced apart from the third disk in the axial direction of the sensor, the second stop block configured to prevent the second flexure element from over deflection in the axial direction.

13. The sensor of claim 12, further comprising:

a first dowel pin extending from the second disk and passing through the first disk, wherein there is clearance between the first dowel pin and the first disk in an extending direction of the first disk, and wherein the first dowel pin is configured to prevent the first flexure element from over deflection in a radial direction and a circumferential direction of the sensor; and a second dowel pin extending from the third disk and passing through the fourth disk, wherein there is clearance between the second dowel pin and the fourth disk in an extending direction of the fourth disk, and wherein the second dowel pin is configured to prevent the second flexure element from over deflection in a radial direction and a circumferential direction of the sensor.

14. The sensor of claim 8, further comprising:

a top case connected to the first disk;

a bottom case connected to the fourth disk; and a seal connected between the top case and the bottom case, wherein the top case, the bottom case, and the seal cooperatively enclose the upper sensing assembly and the lower sensing assembly.

15. A robot comprising multiple links and an end effector successively connected, wherein the end effector comprises a multi-axis force and torque sensor configured to measure force and torque applied on the end effector, the multi-axis force and torque sensor including:

a first supporting element including a first disk and a third disk;

a second supporting element including a second disk and a fourth disk, wherein the first disk, the second disk, the third disk, and the fourth disk are substantially parallel to each other;

a deformable component including (i) a first flexure element connecting the first disk to the second disk and (ii) a second flexure element connecting the third disk to the fourth disk, the deformable component configured to deflect in response to applied external force and torque in multiple directions; and a plurality of signal pairs, each including a magnet and a hall effect detector, wherein the magnet is mounted on one of the first supporting element and the second supporting element, wherein the hall effect detector is mounted on the other of the first supporting element and the second supporting element, and is located corresponding to the respective magnet, and wherein the magnetization directions of the magnets of the plurality of signal pairs are different such that the plurality of signal pairs are capable of measuring force and torque applied on the first supporting element and the second supporting element in different directions, and wherein the first disk and the second disk cooperatively constitute an upper sensing assembly and the third disk and fourth disk cooperatively constitute a lower sensing assembly, and the upper sensing assembly is stacked on the lower sensing assembly.

16. The robot of claim 15, wherein
the plurality of signal pairs include six signal pairs,
the magnetization directions of the magnets of three of the six signal pairs are parallel to a circumferential direction of the sensor, and
the magnetization directions of the magnets of the other three of the six signal pairs are parallel to an axial direction of the sensor.

17. The robot of claim 15, wherein the multi-axis force and torque sensor further comprises:
a plurality of first bridging structures rigidly connecting the first disk and the third disk; and
a plurality of second bridging structures rigidly connecting the second disk and the fourth disk.

18. The robot of claim 17, wherein
each of the plurality of first bridging structures includes a first stop block spaced apart from the second disk in an axial direction of the sensor, the first stop block configured to prevent the first flexure element from over deflection in the axial direction;
each of the plurality of second bridging structures includes a second stop block spaced apart from the third disk in the axial direction of the sensor, the second stop block configured to prevent the second flexure element from over deflection in the axial direction.

* * * * *